United States Patent Office 3,705,815
Patented Dec. 12, 1972

3,705,815
LIME AND SILICA-RICH HIGH ALUMINA CEMENT, AND PROCESS FOR MANUFACTURING SAME
René Alegre and Raymond Allegre, Montelimar, France, assignors to Societe Anonyme dite Ciments Lafarge, Paris, France
No Drawing. Filed Sept. 15, 1971, Ser. No. 180,855
Claims priority, application France, Nov. 9, 1970, 7040245
Int. Cl. C04b 7/32
U.S. Cl. 106—104
3 Claims

ABSTRACT OF THE DISCLOSURE

A lime and silica-rich high-alumina cement and the process for manufacturing it.

A lime and silica-rich high alumina cement which consists, in parts by weight, of about:

8 to 10% $SiO_2$
about 1 to 2% $TiO_2$
26 to 29% $Al_2O_3$
14 to 16% $Fe_2O_3$
0% or traces FeO
45 to 48% CaO the moduli:

$SiO_2/Al_2O_3+Fe_2O_3$ being in the range of about 0.18 to 0.25
$Al_2O_3/CaO$ from 0.55 to 0.65
$Al_2O_3/SiO_2$ between about 2.6 and 3.6 and the mineralogical composition containing CA, $C_2S$, $C_{12}A_7$ and ferrites.

The cement has a broader range of use and its preparation is cheaper.

---

The present invention relates to a new lime and silica-rich high-alumina cement; another object is a process for manufacturing said cement. It should be precized that alumina cements are often named "ciment fondu" (i.e. fused cement).

Numerous alumina cements are already known which, in practice, have satisfactory refractory and mechanical qualities (see Robson: High Alumina Cement and Concrete—ed. Wiley and Son, 1962), but research is constantly going on to improve these cements, and more particularly to obtain cements having equal, or at least, equivalent, qualities at lower cost. With this end in view, it was possible to study compounds which do not possess hydraulic properties and try to render them reactive by physical or chemical treatments; efforts have been made, for instance, to ativate gehlenite in various manners. It was also possible to try to use various known compounds which were unusable on account of their being too reactive, by changing their behavior to eliminate their harmful properties; in this connection $C_3A$ and $C_{12}A_7$, the presence of which in alumina cements is very often considered as undesirable, may be mentioned.

In the present specification A represents $Al_2O_3$, S represents $SiO_2$ and C represents CaO.

Applicants have chosen to undertake work on altering the behaviour of the aforesaid known compounds. A first series of studies on the preparaiton, with or without additives, of a lime (CaO)-rich high-alumina cement, showed that the resistances and strengths obtained with a binder prepared from a bauxite crude comprising less than 5% $SiO_2$ (45%) and limestone (55%) were markedly lower than those of normal high-alumina cement, but not very reactive at the aging temperature.

Applicants then considered using a $SiO_2$-rich bauxite, usually rejected for the industrial manufacture of high-alumina cements, to prepare lime-rich high alumina cements; if this solution were proved possible in practice it would, in fact, have the advantage of permitting poor quality bauxite to be used (notably certain French bauxites), and consequently provide a saving of approximately 30% in the cost of the cement in question, compared with present day high-alumina cement.

To manufacture a hydraulic binder which can be used either in building or to agglomerate iron powders to be treated in a blast-furnace, it has further already been suggested to employ bauxites having an $Al_2O_3:SiO_2$ ratio smaller than 1.5, and which cannot be used for cement manufacture, the silicate $(SiO_2:Al_2O_3+Fe_2O_3)$ modulus being less than 5; according to this known process, said crude is then ground, sintered in a rotary furnace at temperatures not exceeding 1300° C., and finally has from 1 to 5% calcium carbonate added thereto.

During their work and research, applicants established that the binder so obtained had average mechanical qualities and did not possess refractory properties, and further the unexpected fact that it was possible to obtain a high-alumina cement having, at the same time, refractory characteristics substantially equal to those of conventional high-alumina cements, by using a crude consisting of poor quality bauxite and lime. The cement according to the invention is characterized in that it consists, in parts by weight, of about:

8 to 10% of $SiO_2$
1 to 2% $TiO_2$
26 to 29% $Al_2O_3$
14 to 16% $Fe_2O_3$
0% or traces FeO
45 to 48% CaO the moduli $SiO_2/Al_2O_3+Fe_2O_3$ being in the range of about 0.18 to 0.25.
$Al_2O_3CaO$ between about 0.55 and 0.65 and
$Al_2O_3/Sio_2$ between about 2.6 and 3.6 and the mineralogical composition containing CA, $C_2S$, $C_{12}A_7$ and ferrites.

With respect to this, it should be noted that the moduli of the cements mentioned are generally, respectively, from about 0.6 to 1.0, 0.9 to 1.30 and 5 to 10.

The crudes used for the manufacture of this cement are, for example, obtained from:

30 to 50% $SiO_2$-rich bauxite (Bauxite from Les Baux in France for instance) of approximately the following analysis:

| | |
|---|---|
| $SiO_2$ | 15.20 |
| $Al_2O_3$ | 43.00 |
| $Fe_2O_3$ | 24.30 |
| $TiO_2$ | 2.35 |
| CaO | 0.90 |
| Water plus MV | 13.85 |

50 to 70% limestone (such as Orgon limestone).

Generally speaking the setting time of high-alumina cement can be controlled at will by varying the CaO content. Between 0 and 4 hours, for instance, for the start of setting. In the following case the setting time lasts from 2 hours 10 minutes (start) to 2 hours 40 minutes (end) its bending strength (in micro-concrete W/C=0.40, aging 20°) is, in bars, about 23 at 4 hours
39 at 6 hours
71 at 1 day
81 at 7 days and its compression strength (in micro-concrete W/C= 0.40 aging 20°) is, in bars, approximately 120 at 4 hours
255 at 6 hours
555 at 1 day
765 at 7 days A process for obtaining high-alumina cement according to the invention is characterized in that a silica-rich bauxite and a limestone are mixed by crushing so as to form a crude having the following composition calculated on an oxide basis:

$SiO_2$ from 6 to 8%
$TiO_2$ from 1 to 2%
$Al_2O_3$ from 18 to 20%
$Fe_2O_3$ from 8 to 11%
$CaO$ from 30 to 34%

MgO traces, with the ratio A:C from about 0.55 to 0.65, that the crude is fused in a melting-furnace in an oxidising atmosphere (about 3% $O_2$) at a temperature in the range of about 1400° C. to about 1500° C., that the molten clinker is then cooled slowly to a temperature of between 200 and 800° C. at a cooling rate in the range of 250° to 1400° per hour, that said cooled clinker is then crushed, according to the invention, to a Blaine specific surface (SSB) of 2500 to 3500 cm.²/g., and preferably about 3000 cm.²/g.

A specific example of embodiment of the process according to the invention is given hereinbelow.

A starting mixture was used having the following composition:

MIXTURE OF CRUDE 43% BAUXITE, 57% LIMESTONE

| Composition of— | Bauxite | Limestone | Determined crude |
|---|---|---|---|
| $SiO_2$ | 15.25 | 0.20 | 6.65 |
| $TiO_2$ | 2.80 | 0 | 1.20 |
| $Al_2O_3$ | 42.60 | 0.10 | 18.40 |
| $Fe_2O_3$ | 28.40 | 0.05 | 10.15 |
| $CaO$ | 0.15 | 55.50 | 31.70 |
| $MgO$ | 0 | 0 | 0 |
| $K_2O$ | 0.03 | 0.02 | 0.03 |
| $Na_2O$ | 0.03 | 0.01 | 0.02 |
| Fire loss | 15.85 | 43.80 | 31.80 |

Both components were crushed simultaneously so that not more than 5% of them would not pass through a 0.1 mm. mesh sieve.

The mixture was fused at between 1450 and 1500° C., then run out and cooled in 60 minutes from 1450° to 800° and in 60 minutes from 800 to 22° C.

The product obtained was then crushed to a Blaine specific surface of 3040 cm.²/g.

It was found that when the process of the invention was carried out, the cooling rate and nature of the oxidizing atmosphere used had a very marked effect on the mineralogic composition of the clinkers and cements, the cooling rate substantially affecting the concentration of phases and consequently the mechanical strengths of the finished product.

The reducing atmosphere immediately causes the appearance of a fairly large amount of a fibrous component. For a same Blaine specific surface, for an aforesaid high-alumina cement the results given in the following table were obtained for a same cooling rate (from 1450° to 800° C. in 1 hour).

| Gaseous medium, percent | | Compression strength in micro test-pieces | | | Mineralogical composition, X-diffraction—Band intensity | | | | | | |
|---|---|---|---|---|---|---|---|---|---|---|---|
| | | | | | | | | Ferrite | | | |
| CO | $O_2$ | 6 hrs. | 1 day | 7 days | CA | $C_2AS$ | $C_6A_4Sf$ | 2.66 A. | 2.69 A. | $C_2S\beta$ | $C_2S\gamma$ |
| 4.5 | 0 | 33 | 78 | 298 | 9 | | 82 | 117 | 50 | | 52 |
| 1.7 | 0 | 30 | 80 | 282 | 8 | | 68 | 125 | 69 | | 33 |
| 0 | 0 | 85 | 266 | 534 | 27 | 21 | 32 | 105 | 54 | 11 | 13 |
| 0 | 4 | 131 | 330 | 536 | 49 | 15 | 27 | 106 | 63 | 11 | |

The effect of the cooling rate is shown in the following table, which also indicates the mechanical strengths obtained on micro-test pieces of conventional industrial high-alumina cement.

| | Gaseous medium | | Compression strength in micro-test pieces | | | Mineralogical composition, X-diffraction—Band intensity | | | | | | | |
|---|---|---|---|---|---|---|---|---|---|---|---|---|---|
| | | | | | | | | | | Ferrite | | | |
| Cooling rate (1) | CO | $O_2$ | 6 hrs. | 1 day | 7 days | Ca | $C_{12}A_7$ | $C_2AS$ | $C_6A_4Sf$ | 2.66 A. | 2.69 A. | $C_2S\beta$ | $C_2S\gamma$ |
| B | 0 | 3.8 | 55 | 192 | 540 | 30 | | 16 | 22 | 68 | 42 | | |
| C | 0 | 4.0 | 142 | 458 | 622 | 59 | | 8 | | 123 | 65 | | |
| D | 0 | 4.0 | 176 | 500 | 682 | 67 | | | 18 | 125 | 66 | 12 | |
| E | 0 | 4.3 | 170 | 556 | 632 | 76 | 7 | | | 134 | 76 | 5 | 22 |
| Test piece of industrial high alumina cement | | | 290 | 660 | 784 | | | | | | | | |

The cooling rates being as follows:

| Designation test piece | Temperature observed following cooling for— | | | | | |
|---|---|---|---|---|---|---|
| | 5 mins. | 10 mins. | 15 mins. | 20 mins. | 25 mins. | 30 mins. |
| B, °C | 1,150 | 600 | 450 | 300 | 250 | 200 |
| C, °C | 1,350 | 1,250 | 1,100 | 900 | 750 | 650 |
| D, °C | 1,400 | 1,300 | 1,200 | 1,000 | 900 | 800 |
| E | 2 hrs. to drop from 1,500 to 1,200° C., and 1 hr. to drop from 1,200 to 800° C. | | | | | |

The preceding figures and Table I below show that:

the CA and alumino-ferrite contents increase when the cooling rate decreases;

with the slowest cooling, resistances at 4 h. and 6 h. are substantially improved (about +50 to +60 bars).

The cement according to the invention has:

good aging characteristics in thermal cycle (the thermal cycle is a test which reproduces in the laboratory the heating cycle—i.e. cycle of heat evolved on setting—which occurs when a large mass of concrete is used), which show, compared with the known industrial high-alumina cement;

that the beginning of the rise in temperature is very close;

that heating (heat evolved on setting) is slightly less rapid;

that the maximum temperature reached (59° C.) is markedly lower: by 18° C.

As the second Table II hereinafter shows, mechanical test reveal the very important fact that, contrary to what occurs with industrial high-alumina cement, the rise in temperature resulting from the thermal cycle has little effect on the strengths of CaO and SiO₂-rich high-alumina cement.

It is seen that CaO and SiO₂-rich high alumina cements enable mixtures to be formed quickly.

I.—RESULTS OBTAINED WITH THE FOLLOWING CASTINGS, SLOWING DOWN THE COOLING RATE

| Casting system | Mineralogical composition X-diffraction—band intensity | | | | | | | | Compression strength, microconcret (W/C=0.40 bars) | | |
|---|---|---|---|---|---|---|---|---|---|---|---|
| | | | | | | | Ferrite | | | | |
| | CA | C₁₂A₇ | C₄A₄Sf | C₂AS | C₂Sβ | C₂Sγ | 2.96 A. | 2.69 A. | 4 hrs. | 6 hrs. | 1 day |
| Casting ingot moulds, air-cooling | 36 | 11 | 18 | 10 | 8 | | 74 | 67 | 70 | 195 | 555 |
| Casting in crucible (φ=10 cm., height 25 cm.) insulated with insulating refractory concrete | 48 | 15 | 20 | 26 | 11 | | 95 | 50 | 60 | 185 | 560 |
| Crucible casting (φ=10 cm., height 25 cm.) insulated with insulating refractory concrete, preheated at about 800° C | 64 | 17 | 24 | 17 | 15 | 13 | 103 | 54 | 120 | 255 | 540 |

II.—MECHANICAL TESTS

| | Percent drops in resistances | | |
|---|---|---|---|
| | 1 day | 7 days | 28 days |
| CaO and SiO₂-rich high-alumina cement | 12 | 8 | 4 |
| Industrial high-alumina cement | 44 | 42 | 45 |

From said tests it appears that resistance continues to increase rapidly after the thermal cycle, the strengths of the high-alumina cement according to the invention are slightly higher at 1 day (+40 bars) and substantially higher at 7 and 28 days (≃+200 bars).

Underwater aging tests at 50° C. were also carried out to determine the stability of the mechanical resistances and the kinetic of the development of hydrated aluminates. Test-bars made of microconcrete at $W/C=0.40$ are first aged for 28 days in moist air at 20° C., then immersed in water at 50° C. Reckoning from said immersion, and at determined periods of time, the evoluation of strengths and the crystalline constitution are determined.

As to the crystalline construction, the progressive disappearance of $CAH_{10}$ and increase in the $C_3AH_6$ content is observed.

After 7 days under water at 50° C., it can be considered that $CAH_{10}$ has disappeared completely and that only $C_3AH_6$ remains.

This development is absolutely comparable to that normally observed in industrial high-alumina cement.

Underwater aging at 70° C. was also observed. This test was carried out on 4 x 4 x 16 cm. prisms of microconcrete at W/C=0.40. As soon as they are positioned, the test-bars are aged for 6 hours in steam at 70° C., then immersed in water at 70° C. These particularly severe test conditions have absolutely no bearing on reality, but permit minimum strengths to be determined.

Compared with industrial high-alumina cement, the strengths obtained with the product according to the invention are:

lower than 50 bars after a period of 6 hours;
identical after a period of 1 to 7 days.

Examination of the development of the crystalline constitution shows that, at 6 hours, the aluminates are completely hydrated in cubic form which, moreover, corresponds logically to the weakest strength observed. Industrial alumina cement behaves in the same manner under the same test conditions.

The cement according to the invention was tested as a pure paste to discover its ability to form mixtures quickly. The tests gave the following results:

| | Mixtures tested | | | |
|---|---|---|---|---|
| | Percent CaO and SiO₂ rich high-alumina cement, Blaine specific surface 3,160 cm.²/g. | Setting as pure paste | | |
| Percent CPA 400 HTS | | Percent H₂O | Start, min. | End, min. |
| 80 | 20 | 32 | 21 | >40 |
| 70 | 30 | 32 | 14 | 35 |
| 60 | 40 | 32 | 6 | 9 |

The refractory characteristics were studied, and are summarized hereinbelow, by pyroscopic resistances and resistance to twisting (during heating at 1000°):

Designation of the cement: Melting point in (° C.)
   CaO and SiO₂-rich-high alumina cement,
     January 1970 melt _____ 1270
   Industrial alumina cement sampled on:
     November 12, 1969 _____ 1280
     December 9, 1969 _____ 1290

The point of fusion of the cement according to the invention is very close to that of industrial alumina cement (−10 to −20° C.).

TORSIONAL STRENGTH DURING HEATING AT 1,000° C.

| Mortar used | Type of cement | Twisting strength at 1,000° C., bars |
|---|---|---|
| Chamotte mortar SOGDAR, 0-5 mm. at a rate of 5 0 kg./m.³ | CaO and SiO₂-rich high-alumina cement according to the invention. | 30 |
| | Industrial alumina cement. | 25 |

The CaO and SiO₂-rich cement is seen to have a slight advantage.

Finally differential deflection under 2 bars gave the following results:

Tests carried out with chamotte mortar SOGDAR at a rate of 500 kg./m.³

| erce nt deflection | 0.5 | 1 | 2 | 5 |
|---|---|---|---|---|
| Type of cement: | | | | |
| CaO and SiO₂-rich high-alumina cement, melt of January 1970, ° C | 1,170 | 1,220 | 1,270 | 1,300 |
| Industrial alumina cement, ° C | 1,140 | 1,195 | 1,270 | 1,340 |

The deflection under load of the binder studied is practically equivalent to industrial alumina cement.

The tests carried out showed that the CaO and SiO₂-rich cement according to the invention has a refractory power approximately the same as that of industrial alumina cement.

Various known additives, notably lithium carbonate (from about 0.01% to 1% by weight of the cement) and calcium borate (from about 2% to 10% by weight of the cement) have a favorable effect on the strength of cements according to the invention. For instance, 0.065% lithium carbonate added to the mixing water enables the resistance at 20° C. to be doubled (from 70 to 145 bars) after a period of four hours and an increase of 30 bars at 6 hours.

From the standpoint of cost, it should be noted that CaO and SiO₂-rich high-alumina cements according to the invention can be manufactured from SiO₂-rich bauxites which are usually rejected for the manufacture of high-alumina cements.

Furthermore, a lower percentage of bauxite is used.

These conditions of manufacture result in a cost approximately 30% lower compared with that of conventional high-alumina cement.

What we claim:

1. A lime and silica-rich high-alumina cement consisting, in parts by weight, of about:
   8 to 10% SiO₂ about 1 to 2% $TiO_2$
26 to 29% $Al_2O_3$
14 to 16% $Fe_2O_3$
0% or traces FeO
45 to 48% CaO
the moduli:
$SiO_2/Al_2O_3+Fe_2O_3$ being in the range of about 0.18 to 0.25
$Al_2O_3/CaO$ between about 0.55 and 0.65 and $Al_2O_3/SiO_2$ between about 2.6 and 3.6 with a mineralogical composition containing CA, $C_2S$, $C_{12}A_7$ and ferrites.

2. A process for the manufacture of high-alumina cement according to claim 1, comprising the steps of mixing by crushing a silica-rich bauxite and a limestone to form a crude having the following composition calculated on an oxide basis:
$SiO_2$ from 6 to 8%
$TiO_2$ from 1 to 2%
$Al_2O_3$ from 18 to 20%
$Fe_2O_3$ from 8 to 11%
CaO from 30 to 34%
MgO traces, with a ratio $Al_2O_3/CaO$ from 0.55 to 0.65,
fusing the crude in a melting furnace with an oxidizing atmosphere at about 3% $O_2$, at a temperature in the range of about 1400° C. to 1500° C., then slowly cooling the molten clinker to a temperature in the range of about 200 to 800° C., with a cooling rate of between 250° and 1400° C. per hour, grounding the cooled clinker to a Blaine specific surface of 2500 to 3500 cm.²/g.

3. The process of claim 2, in which the Blaine specific surface is of about 3000 cm.²/g.

References Cited

UNITED STATES PATENTS 3,298,843  1/1967  Asano _____ 106—100

FOREIGN PATENTS 482,185  8/1929  Germany _____ 106—104

OTHER REFERENCES

Robson, T. D., "High-Alumina Cements and Concretes," John Wiley & Sons, Inc., pp. 19-27, 39 and 40 (1963).

JAMES E. POER, Primary Examiner

W. T. SCOTT, Assistant Examiner

U.S. Cl. X.R.

106—89, 100

PO-1050
(5/69)

UNITED STATES PATENT OFFICE
CERTIFICATE OF CORRECTION

Patent No. 3,705,815          Dated December 12, 1972

Inventor(s) Rene Alegre and Raymond Allegre

It is certified that error appears in the above-identified patent and that said Letters Patent are hereby corrected as shown below:

Column 1, line 55, "ativate" should be --activate--;
Column 2, line 41, "$Al_2O_3CaO$" should be --$Al_2O_3/CaO$--;
line 42, "$Al_2O_3/SiO_2$" should be --$Al_2O_3/SiO_2$--; Column 4, line 23, "2.66 A. 2.69 A." should be --2.66 Å  2.69 Å--; line 25, "33" (last figure) should be --39--; line 35, the placing of "Cooling rate" should be in the main heading on the line with "Gaseous medium"; line 35, "2.66 A. 2.69 A." should be --2.66 Å  2.69 Å--;  Column 5, line 33, "evoluation" should be --evolution--; line 36, "constrution" should be --constitution--; Column 6, line 7, "2.66 A. 2.69 A." should be --2.66 Å  2.69 Å--; line 33, "5 0 kg./m.$^3$" should be --500 kg/m$^3$--.

Signed and sealed this 12th day of June 1973.

(SEAL)
Attest:

EDWARD M. FLETCHER, JR.          ROBERT GOTTSCHALK
Attesting Officer                Commissioner of Patents